US009099003B2

(12) United States Patent  
Dedes et al.

(10) Patent No.: US 9,099,003 B2  
(45) Date of Patent: *Aug. 4, 2015

(54) GNSS/IMU POSITIONING, COMMUNICATION, AND COMPUTATION PLATFORMS FOR AUTOMOTIVE SAFETY APPLICATIONS

(71) Applicants: George C. Dedes, Powell, OH (US); Kyriakos C. Mouskos, West Orange, NJ (US)

(72) Inventors: George C. Dedes, Powell, OH (US); Kyriakos C. Mouskos, West Orange, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,271

(22) Filed: Dec. 6, 2013

(65) Prior Publication Data

US 2014/0100713 A1    Apr. 10, 2014

Related U.S. Application Data

(63) Continuation of application No. 13/135,862, filed on Jul. 15, 2011, now Pat. No. 8,639,426.

(60) Provisional application No. 61/399,613, filed on Jul. 15, 2010.

(51) Int. Cl.
| | |
|---|---|
| G05D 1/00 | (2006.01) |
| G08G 1/16 | (2006.01) |
| G01C 21/16 | (2006.01) |
| G01C 21/36 | (2006.01) |

(52) U.S. Cl.  
CPC .............. *G08G 1/164* (2013.01); *G01C 21/165* (2013.01); *G01C 21/3697* (2013.01); *G08G 1/163* (2013.01); *B60T 2201/08* (2013.01); *B60T 2210/36* (2013.01)

(58) Field of Classification Search  
None  
See application file for complete search history.

(56) References Cited

U.S. PATENT DOCUMENTS

| | | | |
|---|---|---|---|
| 2002/0116126 | A1 | 8/2002 | Lin |
| 2003/0102997 | A1 | 6/2003 | Avraham Freedman et al. |
| 2003/0179084 | A1 | 9/2003 | Kronen et al. |
| 2004/0167740 | A1 | 8/2004 | Kronen et al. |
| 2006/0119473 | A1 | 6/2006 | Gunderson et al. |
| 2006/0293856 | A1 | 12/2006 | Foessel et al. |
| 2007/0043491 | A1 | 2/2007 | Goerick et al. |
| 2008/0189039 | A1 | 8/2008 | Sadekar et al. |
| 2008/0215204 | A1 | 9/2008 | Roy et al. |
| 2008/0289033 | A1* | 11/2008 | Hamilton et al. ............... 726/19 |
| 2009/0292468 | A1 | 11/2009 | Wu et al. |

(Continued)

OTHER PUBLICATIONS

William Strunk, Jr., and E. B. White, The Elements of Style, 3$^{rd}$ Edition, 1979, all pages.*

*Primary Examiner* — Calvin Cheung  
(74) *Attorney, Agent, or Firm* — Lowe Hauptman & Ham, LLP (57) ABSTRACT

A GNSS/IMU safety sensor platform is disclosed consisting of data fusion Processors, GNSS Acquisition and Tracking Processors, MEMS IMU sensors, one or multiple accelerometers able to provide orientation information, optional V2V communication modules, and optional V2I communication modules. The data fusion processors provide interface ports to GNSS/IMU processors, odometers, video (Visual/Infrared) cameras installed in the vehicle, V2V relative positioning sensors (laser, radar or any other distance measuring), and V2V and V2I communication modules. The data fusion processors are interfaced to a driver warning system and optionally to the vehicle controls for providing safety warning messages to drivers, or for automatic control of the vehicle for preventing and reducing accidents.

20 Claims, 6 Drawing Sheets

(56) References Cited

U.S. PATENT DOCUMENTS

| | | |
|---|---|---|
| 2010/0121518 A1 | 5/2010 | Tiernan et al. |
| 2010/0191391 A1 | 7/2010 | Zeng |
| 2010/0228419 A1 | 9/2010 | Lee et al. |
| 2010/0253597 A1 | 10/2010 | Seder et al. |
| 2010/0289632 A1 | 11/2010 | Seder et al. |
| 2011/0190972 A1* | 8/2011 | Timmons et al. ............... 701/29 |

* cited by examiner

GNSS/IMU POSITIONING, COMMUNICATION, AND COMPUTATION PLATFORMS FOR AUTOMOTIVE SAFETY APPLICATIONS

RELATED APPLICATIONS

The present application is a continuation application of U.S. patent application Ser. No. 13/135,862 filed Jul. 15, 2011, titled "GPS/IMU/VIDEO/RADAR ABSOLUTE/RELATIVE POSITIONING COMMUNICATION/COMPUTATION SENSOR PLATFORM FOR AUTOMOTIVE SAFETY APPLICATION," the entire disclosure of which is incorporated by reference herein.

The present application is based on, and claims priority from, U.S. Provisional Application No. 61/399,613, filed Jul. 15, 2010, the entire disclosure of which is incorporated by reference herein.

FIELD

The present application is in the technical field of positioning platforms (absolute/relative) and associated computations for safety applications in the automotive industry.

BACKGROUND

Typical navigational devices installed in cars today are global positioning system (GPS) devices with an accuracy ranging from 2-3 meters to 10-15 meters. Because of low GPS positioning accuracy, such GPS navigational devices are not used for roadway safety applications. These GPS devices are typically used for navigational purposes, providing directions to navigate cars from a current location to a user predefined destination.

The various devices installed in cars today, including radar sensors, video cameras, GPS devices, and odometers, typically process information independently. With independent processing, information may not be combined optimally in a central processor either installed inside a host vehicle (moving vehicle) or in a cloud-server to determine absolute position and orientation (pitch, yaw and roll) of a host vehicle (moving vehicle) and its relative position and orientation (pitch, yaw and roll) relative to other cars (vehicles).

GPS navigation devices having relatively low accuracy are not generally integrated with other sensors, such as odometers, Inertial Navigation (Measurement) Units (IMUs), video cameras for safety applications, relative-positioning devices (e.g., radars), Vehicle-To(2)-Vehicle (V2V), and Vehicle-To(2)-Infrastructure(V2I) communications. Lack of positioning accuracy, absence of orientation information, and lack of integration with other sensors, such as those mentioned above, limit the use of GPS navigation devices for safety applications aiming to reduce and/or to eliminate accidents by issuing warnings to drivers or directly interfacing with controls of a host vehicle to prevent accidents.

SUMMARY

The present disclosure is a GNSS/IMU safety sensor platform consisting of a central data fusion processor integrated with or having data communication paths to 1) one or more global navigation satellite system (GNSS) signals Acquisition and Tracking (all or selected GNSS signals) processors (i.e., ASIC, FPGA, DSP or GPP); 2) one or more microelectromechanical systems (MEMS) IMU sensors with optional multiple accelerometers distributed over the body of a host vehicle and able to provide orientation information (pitch, yaw and roll); 3) to optional V2V communication module(s) and/or optional V2I communication module(s); 4) to an odometer; 5) to video (Visual/Infrared) cameras installed in the vehicle; 5) V2V relative positioning (e.g., laser, radar, inclinometer, compass) sensors, and 6) to a driver warning system and optionally to vehicle controls.

The disclosed architecture allows the central data fusion processor to process all measurements simultaneously in order to estimate the host vehicle's orientation and position within a single lane, and to establish safety situational awareness in the neighborhood of the host vehicle using the data from a GNSS/IMU processor, odometer, video cameras, radar sensor(s), other sensors installed in the host vehicle, and data from other cars in a network. When unsafe vehicle driver behavior is identified or unsafe driving conditions are detected in the neighborhood of the host vehicle, the warning module of the data fusion processor issues safety warnings to neighboring cars through the V2V communication module and/or to the rest of the network through the V2I communication module. Optionally, the data fusion processor includes an automated safety module able to issue commands to the vehicle controls to prevent driver-non-preventable accidents, and a warning module to issue visual and/or audio warnings to the driver.

The disclosed GNSS/IMU/Safety Sensor platform provides the basis for an open architecture allowing users (i.e., car manufacturers) to incorporate data-fusion algorithms, warning, and/or safety modules.

In the context of this disclosure, "processor" means Field Programmable Gate Array(s) FPGAs, one or multiple processors with multi and/or single-cores, Digital Signal Processors (DSPs), and/or General Purpose Processors (GPPs), and/or Central Processing Units (CPUs), and/or Application Specific Integrated Circuits (ASICs), and/or any other ICs designed for a range of specialized applications.

BRIEF DESCRIPTION OF THE DRAWINGS

The present systems are illustrated by way of example, and not by limitation, in the figures of the accompanying drawings, wherein elements having the same reference numeral designations represent like elements throughout and wherein.

DETAILED DESCRIPTION

Figure 1:
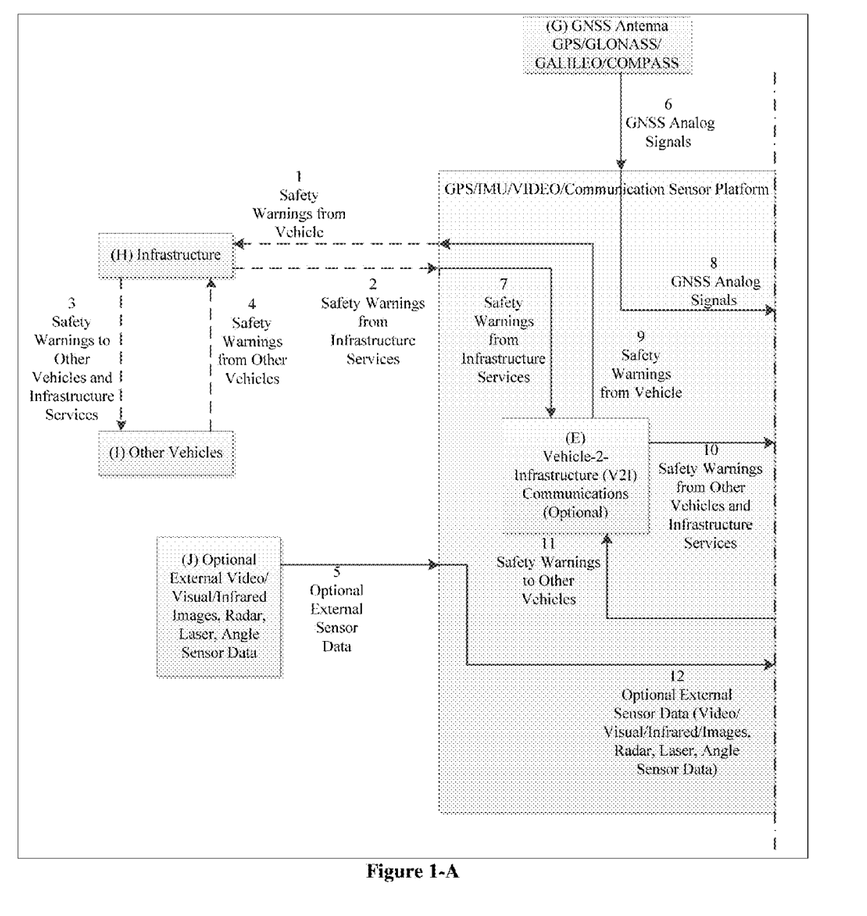
FIGS. 1A-1C are a high level diagram of system architecture and data flow of the present disclosure, in some embodiments.

A GNSS/IMU Safety Sensor and Communication platform for Automotive Safety Applications, in some embodiments, shown in FIGS. 1A-1C, provides an open architecture to interface with video camera(s), radar/laser sensor(s), GNSS/IMU data from other vehicles, an odometer, other vehicle-to-vehicle relative positioning devices, and V2V and V2I communication modules. The GNSS/IMU device estimates in real-time the vehicle position within a single lane of a road and the vehicle orientation (i.e., pitch, yaw and roll).

Lasers/radars and/or video visual/infrared cameras, and/or GNSS/IMU data (GNSS carrier phases, GNSS pseudo-ranges, 3D/2D orientation and acceleration rates) from other vehicles are used to determine the relative position of the current vehicle with respect to rest of the vehicles in the traffic network.

All these data sources are fused together (optimally combined) at the measurement level to estimate optimally the host vehicle orientation, vehicle position within a single lane, and the relative position and orientation of the host vehicle with respect to the rest of the vehicles in the traffic network. This information forms the basis to determine impending preventable or non-preventable accidents based on vehicle type and dynamics. Warnings, through the warning module, are issued to the driver and to the other drivers in the network, through either the V2V and/or the V2I communication modules. When it is determined that an impending accident is not driver-preventable, commands are issued automatically to the vehicle controls to prevent the accident automatically.

In the embodiment depicted in FIGS. 1A-1C and 3, (A) is a central data fusion processor (fuses GNSS/IMU/Accelerometers/Radar/Laser/Angles-azimuth-elevation data, etc.), (B) is a GNSS signal acquisition and tracking/IMU integration processor (tight/ultra-tight integration), (C) is the MEMS IMU and/or accelerometer(s) distributed sensor(s), (D) is an Analog-to-Digital/Down-convert IF section of the GNSS receiver, (E) is a V2I communication module, (F) is a V2V communication module, (G) is a GNSS antenna and associated circuits with a (Low Noise Amplifier) LNA, (H) is the network infrastructure (GSM/CDMA/WiMax/LTE, etc. wireless networks), (I) represents all the other vehicles in the network communicating with the Infrastructure, (J) represents all optional relative positioning sensors (i.e., Laser/Radar, Visual/Infrared video cameras, angle sensors, GNSS/IMU data from other vehicles, etc.), (K) represents the vehicle controls, (M) represents the vehicle driver, and (L) represents the other vehicles in the neighborhood of the current vehicle able to communicate with the current vehicle through a V2V communication device.

In more detail and referring to FIGS. 1A-1C, 3, and 4, the GNSS antenna (G) is configured to pass analog GNSS signal data 6 to the ADC module (D) 8. The ADC module (D) is configured to convert the analog GNSS signals 6/8 to digitized GNSS signals, and transmit 15 the digitized GNSS signals to 415 the GNSS Signal/Acquisition tracking processor (B). The GNSS Signal/Acquisition tracking processor (B) is configured to also receive real-time data from the IMU sensor/distributed accelerometer sensor (C) 16/416 and transmit 14/414 estimated GNSS pseudo-ranges and carrier phases with the raw and/or corrected IMU data to the Data Fusion Processor (A).

The Data Fusion Processor (A) is configured to also receive data 5/12/440 from optional external sensors (J) (i.e., Video Infrared/Visual images, Radar, Lasers, Angle measurement sensors, GPS/IMU data of the host vehicle and from the other vehicles, etc.). In operation, this information is processed (fused or optimally combined) 445 simultaneously to estimate optimally in real-time the position and orientation of the host vehicle, and its relative position with respect to its neighboring vehicles and the rest of the vehicles in the network 450.

The data fusion processor (A) is configured to estimate and monitor the vehicle trajectories in real-time, estimate the vehicle dynamics (position/speed/orientation) of the trailing and/or leading vehicles (i.e., vehicle space and time headways, lane changing behavior, gap acceptance, acceleration and deceleration characteristics, etc.), estimate the deviations of vehicle trajectories from the expected normal ones, such as roadway departures, movement around roadway obstacles (i.e., potholes, debris, disabled vehicles, and other obstacles), detect sudden stops, detect vehicle sliding, and vehicle trajectories moving at 90 degrees within signalized/un-signalized intersections. In operation, this information, together with vehicle dynamics modeling, is used to predict several types of crashes and impending accidents 455 due to trailing collisions, side collisions, lane departures, road departures, sliding, and any other type of collisions or accidents predictable by the real-time data received and integrated within the data fusion processor (A), as described above.

In operation, the above information obtained at the data fusion processor (A), as described above, forms the basis to monitor the safety status of the vehicle with respect to the road, the neighboring vehicles, and the rest of the network. In operation, the Data Fusion processor (A) transmits 23/26/25/27/423 all or selected warning messages to the vehicle driver (M), transmits 17/417 all or selected warning messages to the Vehicle-2-Vehicle communication module (F), transmits 11/411 all or selected messages to the Vehicle-2-Infrastructure communication module (E), and transmits 13/30/413 automatic control commands to the Vehicle controls (K). The commands transmitted 13/30 to the Vehicle Controls (K) are only those related to impending driver-non-preventable accidents.

The data fusion processor (A) is configured to receive safety warning signals from other vehicles through the Vehicle-2-Infrastructure 10/410 communication module (E) and/or through the Vehicle-2-Vehicle communication 18/418 module (F).

The Vehicle-2-Vehicle communication module (F) is configured to transmit 19/22 safety warning and additional data information to the other neighboring vehicles (L), and receive 21/20 safety warning information and/or additional data from the neighboring vehicles (L).

The Vehicle-2-Infrastructure communication module (E) is configured to transmit 9/1 safety warning information and/or additional data to the Infrastructure (H), and receive 2/7 safety warnings or additional data from the Infrastructure (H). The additional data include and are not limited to videos from other vehicles, vehicle-related data (i.e., vehicle operational status) from other vehicles, GPS/IMU data from other vehicles, and infrastructure related information.

In operation, the Infrastructure (H) transmits 3 safety warnings and additional data to the other vehicles (I), and receives 4 safety warnings and additional data from the other vehicles (I). The additional data include and are not limited to videos from other vehicles, vehicle-related (i.e., operational status) data from other vehicles, GPS/IMU data from other vehicles, and infrastructure related information.

The optional External module (J) consists of components configured to interface with external Infrared/Visual video data, Images, radar data, laser data, angle data and any other data available from the host vehicle sensors detecting activity in the neighborhood of the vehicle.

The MEMS IMU sensor and/or distributed accelerometers (C) consists of only an IMU sensor and/or three or more accelerometers distributed over the body of the vehicle able to provide both acceleration and orientation rate information. In operation, this information is transmitted 16/416 for further processing to the GNSS signal acquisition processor (B) and/or to the central data fusion processor (A).

In further detail, still referring to FIGS. 1A-1C, in some embodiments, the central Data Fusion processor (A) is connected to a GNSS (receiver) (G) and/or IMU (sensor) (C) and optionally to a Vehicle-2-Vehicle (V2V) communication module (F), to a Vehicle-2-Infrastructure (V2I) communication module (E), and to additional optional external sensors (J) (i.e., GPS/IMU data from other vehicles, relative ranges and speeds from Laser/Doppler/Radar/Video cameras, etc.).

In operation, the GNSS data and/or orientation rate and acceleration data from the current vehicle are fused (optimally combined) with the radar/laser/Doppler/video/GPS-IMU from other vehicles to provide the position, speed and orientation information of the current vehicle with respect to the other vehicles in the network. This information is then used to predict impending accidents and generate warnings for the driver of the current vehicle and for the drivers of the rest of the vehicles in the network. For those impending accidents which are considered driver-non-preventable, control commands are routed to the controls of the vehicle to prevent these accidents.

In operation, in the absence of Vehicle-2-Vehicle (F) and Vehicle-2-Infrastructure (E) communication modules, the GNSS (B) and/or IMU (C) and/or any data from the other optional sensors (J) is stored in an external storage device (not shown) installed inside the vehicle. This information may be accessed off-line for investigating driving behavior and/or accidents (i.e., vehicle black-box).

In various embodiments such as that depicted in FIGS. 1A-1C, the central Data Fusion processor (A) is any combination of Multi/Single-core of GPPs, DSPs, FPGAS, CPUs, or other ICs for specific product line applications. The GNSS Signal/Tracking and acquisition processor (B) is any combination of GPPs, DSPs, CPUs, FPGAs, ASICs, or ICs specifically designed for GNSS acquisition and tracking. Vehicle-2-Vehicle (V2V) and/or Vehicle-2-Infrastructure (V2I) communication cards employ any wireless technology such as short range communications, GSM, GPSRS, CDMA, W-CDMA, CDMA2000, WiMax, LTE based on either TDMA, CDMA, OFDMA, or any combination of these wireless technologies thereof.

In various embodiments such as that depicted in FIGS. 1A-1C, the central Data Fusion processor (A), the GNSS Signal Acquisition processor (B), the MEMSIIMU and/or accelerometer sensor(s) (C), the Analog-to-Digital Converter (D), the Vehicle-2-Infrastructure(V2I) communication module (E), and the Vehicle-2-Vehicle(V2V) communication module (F) are separated or any combination of them are integrated into one or multiple PCBs. In some embodiments, central Data Fusion processor (A) resides inside a remote server located within an internet cloud infrastructure.

Figure 2:
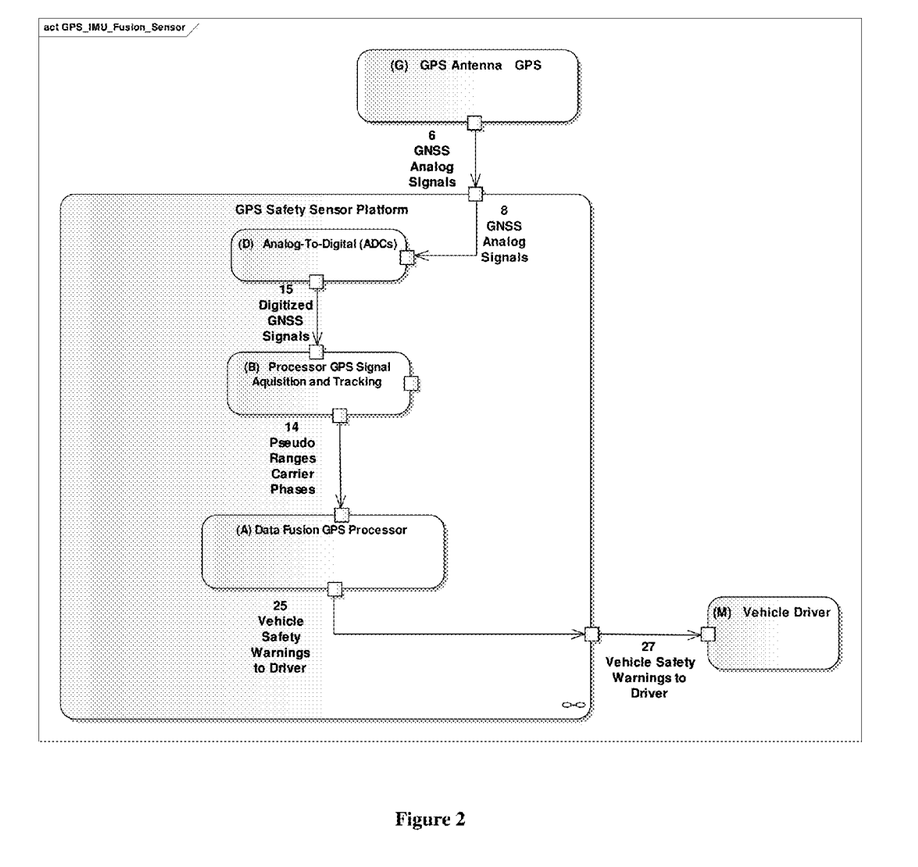
FIG. 2 is a high level diagram of a simplified system architecture and data flow of the present disclosure, in some embodiments.
Figure 3:
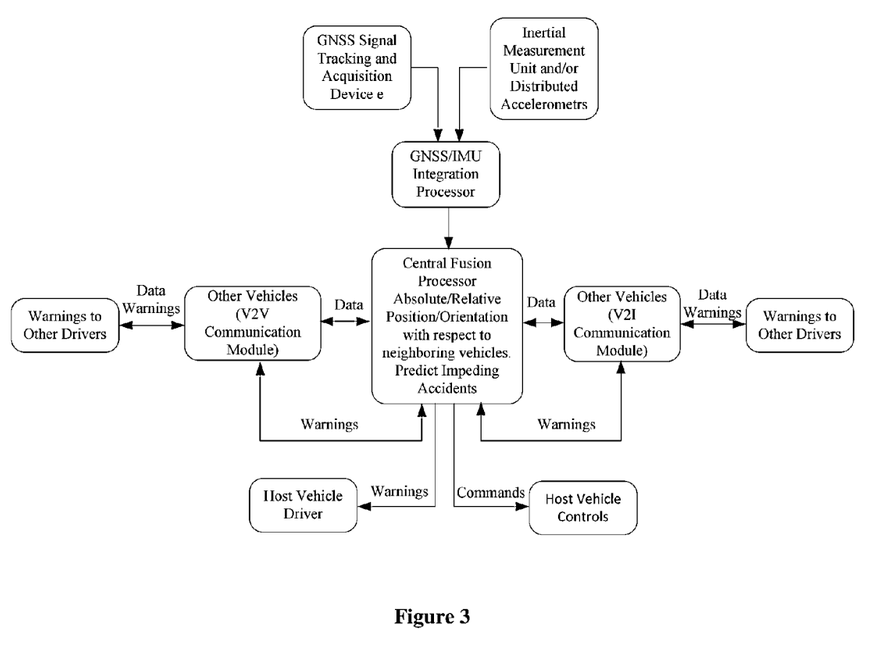
FIG. 3 is a high level diagram of system architecture and data flow of the present disclosure including consolidated representations of various aspects of FIG. 1, in some embodiments.
Figure 4:
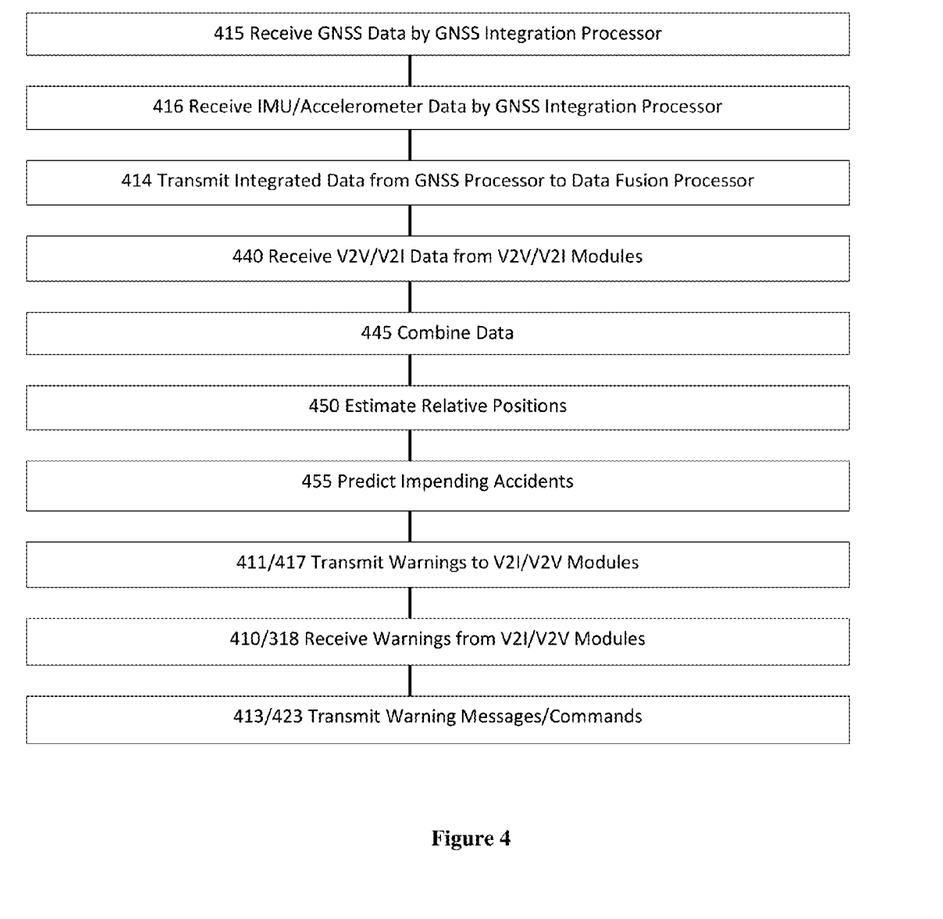
FIG. 4 depicts a method of processing automatic safety information, in some embodiments.

Referring now to the embodiment depicted in FIG. 2, the safety platform for automotive applications consists of only the central Data Fusion GPS Processor (A), the GPS Signal Acquisition and Tracking Processor (B), the Analog-To-Digital part (D) of the receiver and the GPS Antenna with the supporting LNA components (G) able to track the L1 and/or L2 GPS signals.

Referring further to the embodiment depicted in FIG. 2, the GPS antenna and the supporting LNA components (G) is configured to transfer 6/8 the analog GPS signals to the ADC device (D). The ADC device (D) is configured to convert the analog GPS signals to digital signals and transfer 15 the digitized GNSS signals to the GPS signal acquisition and tracking processor (B). The GPS signal acquisition and tracking processor (B) is configured to acquire and track the L1 and/or L2 GPS signals and generate pseudo ranges and carrier phases. In operation, these measurements are transferred 14 to the central Data Fusion GPS processor (A). The Data Fusion GPS Processor (A) is configured to compute the position, the speed of the vehicle, and the trajectory of the host vehicle to determine if the driver drives the vehicle safely (i.e., speed limits, trajectory consistency with the road alignment, etc.). In operation, when the Data Fusion Processor (A) determines that there are safety concerns, it issues 25/27 safety warnings to the Vehicle Driver (M).

Various embodiments of the present disclosure cover any combination of sensors used for safety automotive applications ranging from FIGS. 1A-1C to FIG. 2.

The advantages of the present disclosure include, without limitation, the use of the latest wireless communication technologies, the use of the latest GNSS technologies, combined with all the other sensors installed in the vehicles (i.e., video images, lasers, radars, IMU, accelerometers, etc.) to determine optimally the safety of the vehicles in the roads and to issue safety warning to all the drivers whose vehicles might be affected. When impending driver-non-preventable accidents are detected, the system automatically issues commands to the vehicle controls with the objective of preventing impending driver-non-preventable accidents.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. An automotive safety system comprising:
 a central data fusing processor;
 a global navigation satellite system (GNSS) signal tracking and acquisition device on a host vehicle;
 an Inertial Measurement Unit (IMU) sensor on the host vehicle; and
 a GNSS/IMU integration processor on the host vehicle configured to receive data from the GNSS signal tracking and acquisition device and the (IMU) sensor and transmit integrated data to the central data fusing processor.

2. The system of claim 1, wherein the IMU sensor is one or more accelerometers distributed over the host vehicle.

3. The system of claim 1, wherein the central data fusing processor resides inside a remote server located within an internet cloud infrastructure.

4. The system of claim 1, wherein the central data fusing processor is configured to optimally combine at least two of the integrated data, host vehicle accelerometer measurements, host vehicle radar measurements, host vehicle video data, host vehicle compass measurements, or host vehicle inclinometer measurements to improve position and orientation estimation of the host vehicle.

5. The system of claim 1, wherein the central data fusing processor is configured to optimally combine position and orientation information of the host vehicle with vehicle dynamics theory for different types of vehicles to estimate impending accidents and issue warnings to a driver of the host vehicle or automatically invoke host vehicle controls in order to avoid accidents.

6. The system of claim 1, wherein the central data fusing processor is configured to predict one or more impending accidents, issue warning messages to a driver of the host vehicle, and issue commands automatically to the vehicle controls to avoid impending accidents for which the driver has not enough time to respond.

7. An automotive safety system comprising:
 a central data fusing processor;
 a Vehicle-2-Vehicle (V2V) communication module;
 a Vehicle-2-Infrastructure (V2I) communication module;

a global navigation satellite system (GNSS) signal tracking and acquisition device on a host vehicle;

an Inertial Measurement Unit (IMU) sensor on the host vehicle; and a GNSS/IMU integration processor on the host vehicle configured to receive data from the GNSS signal tracking and acquisition device and the IMU sensor and transmit integrated data to the central data fusing processor.

8. The system of claim 7, wherein the IMU sensor is one or more accelerometers distributed over the host vehicle.

9. The system of claim 7, wherein the central data fusing processor is configured to predict one or more impending accidents, issue warning messages to a driver of the host vehicle, and issue commands automatically to the vehicle controls to avoid impending accidents for which the driver has not enough time to respond.

10. The system of claim 7, wherein the central data fusing processor resides inside a remote server located within an internet cloud infrastructure.

11. The system of claim 7, wherein the host vehicle is part of a network and the central data fusing processor, the V2V communication module, and the V2I communication module are configured to issue one or more warnings to other vehicles in the network.

12. The system of claim 7, wherein the host vehicle is part of a network and the central data fusing processor is configured to issue one or more warnings to a driver of the host vehicle from one or more other vehicles in the network.

13. The system of claim 7, wherein the host vehicle is part of a network and the central data fusing processor is configured to optimally combine GNSS measurements from other vehicles in the network with corresponding measurements of the host vehicle to estimate relative position of the host vehicle with respect to other vehicles in the network.

14. The system of claim 7, wherein the host vehicle and other vehicles are part of a network and the central data fusing processor is configured to optimally combine the relative position, speed and orientation of the host vehicle with respect to other vehicles in the network using vehicle dynamics theory for different type of vehicles to compute the real-time trajectories of the host vehicle and other vehicles in the network and predict one or more impending accidents.

15. A method of processing automotive safety information comprising:

receiving, by a global navigation satellite system/inertial measurement unit (GNSS/IMU) integration processor on a host vehicle, data from a GNSS signal tracking and acquisition device on the host vehicle;

receiving, by the GNSS/IMU integration processor, data from at least one of an IMU sensor or distributed accelerometers on the host vehicle; and transmitting, from the GNSS/IMU integration processor, integrated data to a central data fusing processor.

16. The method of claim 15, further comprising:

estimating optimally in real-time, by the central data fusing processor, position and orientation of the host vehicle using the integrated data.

17. The method of claim 16, further comprising:

receiving, by the central data fusing processor, data from a Vehicle-2-Vehicle (V2V) communication module;

receiving, by the central fusing processor, data from a Vehicle-2-Infrastructure (V2I) communication module; and estimating optimally in real-time, by the central data fusing processor, relative position of the host vehicle with respect to neighboring vehicles using the integrated data and one or more of data from the V2V communication module or data from the V2I communication module.

18. The method of claim 17, further comprising:

predicting, by the central data fusing processor, one or more impending accidents; and transmitting, by the central data fusing processor, one or more warnings to one or more of the V2V communication module or the V2I communication module.

19. The method of claim 17, further comprising:

receiving, by the central data fusing processor, one or more warnings from one or more of the V2V communication module or the V2I communication module; and transmitting, by the central data fusing processor, at least one of all or selected warning messages to a driver of the host vehicle or commands to host vehicle controls to avoid one or more impending accidents.

20. The method of claim 17, further comprising:

combining optimally, by the central data fusing processor, data from one or more of the V2V communication module or the V2I communication module comprising at least two of other vehicle IMU measurements, other vehicle radar measurements, other vehicle video image measurements, other vehicle compass measurements, other vehicle inclinometer measurements, or other vehicle sensor measurements to compute relative position and relative orientation of the host vehicle with respect to one or more other vehicles.

* * * * *